United States Patent
Michalko

(10) Patent No.: US 7,439,634 B2
(45) Date of Patent: Oct. 21, 2008

(54) ELECTRICAL STARTING, GENERATION, CONVERSION AND DISTRIBUTION SYSTEM ARCHITECTURE FOR A MORE ELECTRIC VEHICLE

(75) Inventor: Rodney G. Michalko, Queensville (CA)

(73) Assignee: Honeywell International Inc., Morristown, NJ (US)

( * ) Notice: Subject to any disclaimer, the term of this patent is extended or adjusted under 35 U.S.C. 154(b) by 160 days.

(21) Appl. No.: 11/206,751

(22) Filed: Aug. 19, 2005

(65) Prior Publication Data

US 2006/0061213 A1   Mar. 23, 2006

Related U.S. Application Data

(60) Provisional application No. 60/603,631, filed on Aug. 24, 2004.

(51) Int. Cl.
H02J 1/10 (2006.01)
(52) U.S. Cl. ............................... 307/43; 307/66; 307/84
(58) Field of Classification Search .................... 307/66, 307/64, 9.1, 84, 43, 44
See application file for complete search history.

(56) References Cited

U.S. PATENT DOCUMENTS

| | | | |
|---|---|---|---|
| 4,472,780 A | 9/1984 | Chenoweth et al. | 364/434 |
| 4,600,870 A | 7/1986 | Martin | 318/60 |
| 4,649,484 A | 3/1987 | Herzog et al. | 364/424 |
| 4,887,214 A | 12/1989 | Takats et al. | 364/424.01 |
| 5,274,554 A | 12/1993 | Takats et al. | 364/424.03 |
| 5,406,472 A | 4/1995 | Simmons et al. | 364/133 |
| 5,493,497 A | 2/1996 | Buus | 364/434 |
| 5,515,282 A | 5/1996 | Jackson | 364/434 |
| 5,550,736 A | 8/1996 | Hay et al. | 364/424.03 |
| 5,936,318 A | 8/1999 | Weiler et al. | 307/66 |
| 6,344,700 B1 * | 2/2002 | Eisenhauer et al. | 307/64 |
| 6,367,031 B1 | 4/2002 | Yount | 714/11 |
| 6,633,802 B2 | 10/2003 | Sodoski et al. | 701/36 |
| 6,747,365 B2 | 6/2004 | Reinold et al. | 307/9.1 |
| 6,856,045 B1 | 2/2005 | Beneditz et al. | 307/43 |
| 6,860,452 B2 | 3/2005 | Bacon et al. | 244/194 |
| 2002/0108065 A1 | 8/2002 | Mares | |

(Continued)

FOREIGN PATENT DOCUMENTS

EP   0 838 396 A1   4/1998

(Continued)

*Primary Examiner*—Michael J Sherry
*Assistant Examiner*—Carlos Amaya
(74) *Attorney, Agent, or Firm*—Oral Caglar Esq.

(57) ABSTRACT

A system (200) for distributing electrical power, includes: a first high voltage AC power distributing unit (210a) including a first high voltage AC bus (214a-1, 214a-2), which is selectively connected to a first high voltage AC generator (224a), and a first start bus (212a); a second high voltage AC power distributing unit (210b) including a second high voltage AC bus (214b-1, 214b-2), which is selectively connected to a second high voltage AC generator (224b), and a second start bus (212b); a first high voltage DC power distributing unit (240a) including, a first high voltage DC bus (246a), and a second high voltage DC power distributing unit (240b) including a second high voltage DC bus (246b). The first high voltage AC bus (214a-1, 214a-2) is selectively connectable to the second high voltage AC bus (214b-1, 214b-2), such that the system (200) provides redundancy for high voltage power distribution.

20 Claims, 2 Drawing Sheets

U.S. PATENT DOCUMENTS

| | | |
|---|---|---|
| 2003/0095367 A1 | 5/2003 | Mares et al. |
| 2004/0119454 A1 | 6/2004 | Chang et al. |
| 2004/0129835 A1 | 7/2004 | Atkey et al. |
| 2004/0181295 A1 | 9/2004 | Wagner |
| 2005/0006956 A1 | 1/2005 | Shi |

FOREIGN PATENT DOCUMENTS

| | | |
|---|---|---|
| WO | WO-90/08893 A1 | 8/1990 |
| WO | WO-99/41146 A1 | 8/1999 |

* cited by examiner

ELECTRICAL STARTING, GENERATION, CONVERSION AND DISTRIBUTION SYSTEM ARCHITECTURE FOR A MORE ELECTRIC VEHICLE

RELATED APPLICATIONS

The present application claims priority under 35 U.S.C. §119(e) of provisional patent application Ser. No. 60/603,631 filed Aug. 24, 2004, which is hereby incorporated by reference in its entirety. The present application is related to: a copending U.S. application Ser. No. 11/199,151, filed on Aug. 9, 2005, entitled "Electrical Power Distribution System and Method with Active Load Control", a co-pending U.S. application Ser. No. 11/196,323, filed on Aug. 4, 2005, entitled "Electrical Energy Management System on a More Electric Vehicle", and a co-pending U.S. application Ser. No. 11/206,020, filed on Aug. 18, 2005, entitled "Method and System for Coordinating Engine Operation with Electrical Power Extraction in a More Electric Vehicle," which are hereby incorporated by reference in their entirety.

FIELD OF THE INVENTION

The present invention relates to electrical power distribution, and more particularly to a redundant, symmetrical system for electrical engine starting, power generation, power conversion, and distribution.

BACKGROUND OF THE INVENTION

In a More Electric Vehicle (MEV), the electrical system starting, generation, conversion and distribution system should serve several new functions to properly meet the power supply requirements of the more electric utilization systems and equipment. MEV architectures have been proposed to shift the primary motive power sources used for systems and services from pneumatic (engine bleed) and engine driven hydraulic sources to engine driven electric sources. In order to supply these systems in the most efficient manner, the electrical system should take on a configuration that differs from conventional vehicles. In one configuration, electrical generators can be fixed frequency, arrived at by using some type of hydro mechanical or electronic means to convert the varying speed of the propulsion engine into fixed (e.g., 400 Hz) frequency AC electrical power. Alternately, the generator can be connected directly to the engine gearbox, without the frequency converting equipment, and allowed to vary its output frequency within predetermined limits defined by the engine speed and gearbox ratio.

Although variable frequency (VF) has been frequently used on turbo propeller aircraft in the past to produce narrowband VF power, turbofan engines are only now adopting VF as technology advancements remove the previous concerns about wideband VF. Motor controllers are being developed to adapt the relatively wideband (2:1) VF that is characteristic of the turbofan engine speed range into more appropriate and efficient drive power for speed sensitive motors. As wideband VF becomes more prevalent, industry is also responding with more wideband frequency tolerant passive equipment (i.e., equipment that does not require active input quality conditions). Benefits of the VF generators are that they significantly reduced complexity as compared with their fixed frequency counterparts, and this simplicity translates into more efficient, lower weight and higher reliability power generation systems for new aircraft or other vehicle designs. This works well on a MEV with the concept of electrically starting the engines since the variable frequency generator design is the most suitable configuration to enable the generator to be configured by an external motor controller as a starting motor.

Another change in electrical power system design is the movement to "double voltage" (e.g., 230/400 VAC) generators to reduce generator and wiring weight in the vehicle. Since the MEV makes significant use of motor controllers and motor controllers that switch high voltage DC power to synthesize a driving power source for the various motors, the double voltage supply is preferable for creating a HVDC (typically, ± 270 VDC) source through relatively simple rectification methods. Therefore, the electrical systems of the future should be able to supply the electrical power types required by the new MEV components and systems while continuing to support traditional 115/200 VAC and 28 VDC services. Another challenge for the MEV electrical system results from the higher criticality and availability of electrical power required by the systems and services that it supports. As more systems move from pneumatic and hydraulic power supplies, the electrical system becomes the single source of motive force for those systems.

The inventor of this application has recognized that current drawbacks/needs can be addressed by providing an electrical system that ensures that sufficient redundancy and reliability are designed into the architecture to meet the safety considerations for the utilization equipment. Furthermore, the inventor of this application has further recognized that current drawbacks/needs can be addressed by providing an MEV electrical system architecture of robust design, which provides the high criticality and high availability service desired.

SUMMARY OF THE INVENTION

In one aspect, the present invention is a system for distributing electrical power, comprising: a first high voltage AC power distributing unit including a first high voltage AC bus, which is selectively connected to a first high voltage AC generator, and a first start bus; a second high voltage AC power distributing unit including a second high voltage AC bus, which is selectively connected to a second high voltage AC generator, and a second bus; a first high voltage DC power distributing unit including a first rectifier unit, a first high voltage DC bus, and a first motor controller, the first rectifier being selectively connected to the first high voltage AC bus of the first high voltage AC power distributing unit to convert high voltage AC power to high voltage DC power, which is provided to the first high voltage DC bus; and a second high voltage DC power distributing unit including a second rectifier unit, a second high voltage DC bus, and a second motor controller, the second rectifier being selectively connected to the second high voltage AC bus of the second high voltage AC power distributing unit to convert high voltage AC power to high voltage DC power, which is provided to the second HVDC bus. The first high voltage bus is selectively connectable to the second high voltage DC bus and the first high voltage AC bus is selectively connectable to the second high voltage AC bus. The system provides redundancy for both high voltage AC power distribution and high voltage DC power distribution.

In another aspect, the present invention is a system for distributing electrical power, comprising: a first high voltage AC power distributing unit including a first high voltage AC bus, which is selectively connected to a first high voltage AC generator; a second high voltage AC power distributing unit including a second high voltage AC bus, which is selectively connected to a second high voltage AC generator; a first low voltage AC power distributing unit including a first low voltage AC bus and a first AC essential bus, which is selectively connectable to a first emergency generator and selectively connectable to the first low voltage AC bus, wherein the first low voltage AC power distributing unit is selectively connectable to the first high voltage AC bus to convert high voltage AC power to low voltage AC power, which is output to the first low voltage AC bus; a second low voltage AC power distributing unit including a second low voltage AC bus and a second AC essential bus, which is selectively connectable to a second emergency generator and selectively connectable to the second low voltage AC bus, wherein the second low voltage AC power distributing unit is selectively connectable to the second high voltage AC bus to convert high voltage AC power to low voltage AC power, which is output to the second low voltage AC bus; a first low voltage DC power distributing unit including a first low voltage DC essential bus and a first low voltage DC main bus; and a second low voltage DC power distributing unit including a second low voltage DC essential bus and a second low voltage DC main bus. The first high voltage AC bus is selectively connectable to the second high voltage AC bus, the first low voltage AC bus is selectively connectable to the second low voltage AC bus, the first AC essential bus is selectively connectable to the second AC essential bus, the first low voltage DC essential bus is selectively connectable to the second low voltage DC essential bus, and the first low voltage DC main bus is selectively connectable to the second low voltage DC main bus, thereby providing redundancy of both low voltage AC power distribution and low voltage DC power distribution.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In one aspect, a disclosed embodiment is a redundant, symmetrical system for electrical engine starting, power generation, conversion and distribution, maximizing reconfiguration at primary and secondary bus levels without single string paths who's failure to function can affect function, operation and dispatch. Although aspects of the detailed description provided herein are specific to implementation in a more electric aircraft (MEA), it should be recognized that principles of the present invention are not limited to such an application, and can be applied to other vehicles types.

Figure 1:
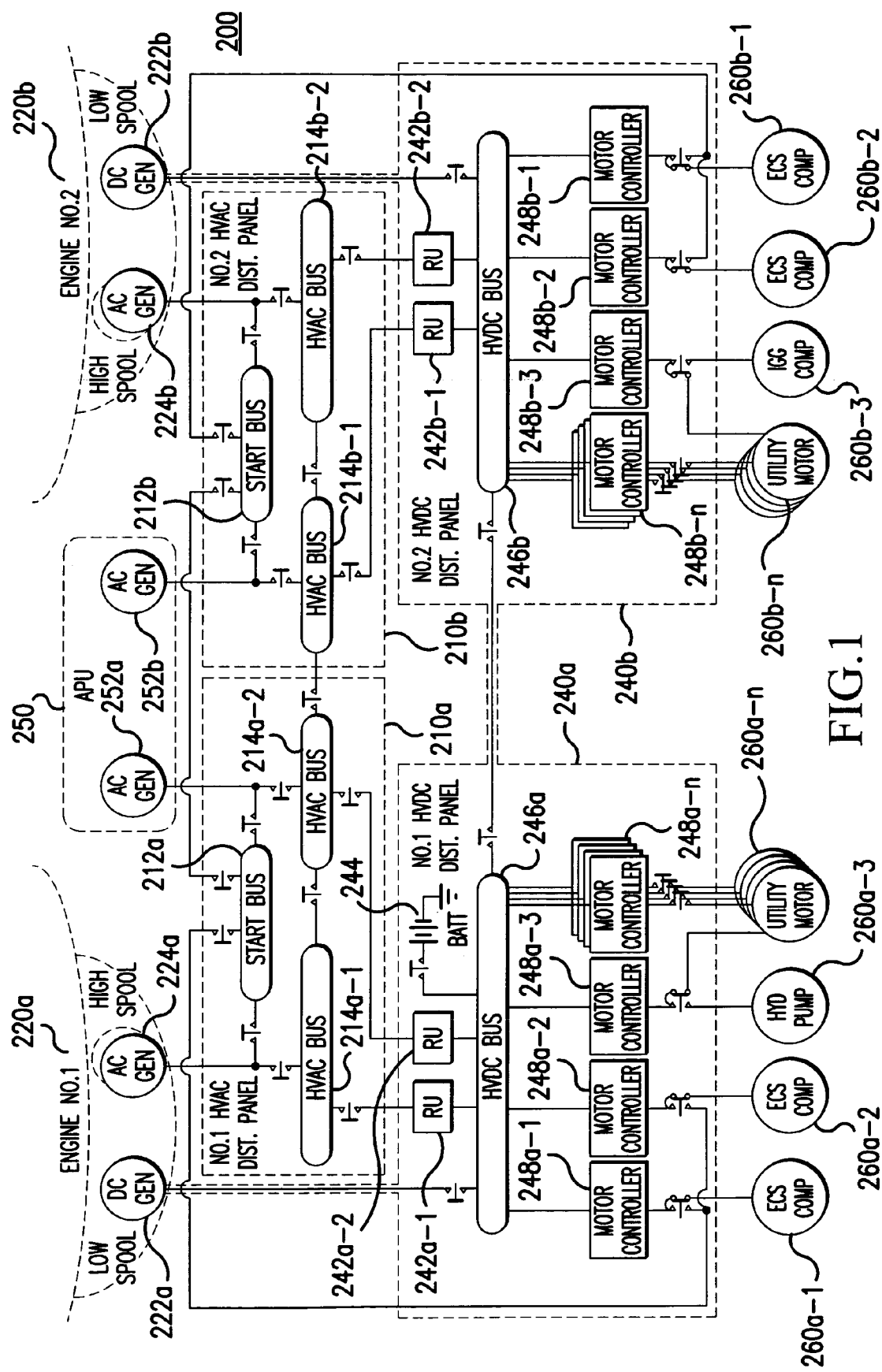
FIG. 1 illustrates an architecture for high voltage electrical starting, generation, and distribution in a more electric vehicle in accordance with an embodiment of the present invention.

FIG. 1 illustrates an architecture for high voltage electrical starting, generation, and distribution in an MEV in accordance to an embodiment of the present invention. In the embodiment of FIG. 1, a high voltage electrical power system 200 includes: first and second engines 220a, 220b; first and second high voltage AC (HVAC) distribution units 210a, 210b; first and second high voltage DC (HVDC) distribution units 240a, 240b; and an auxiliary power unit (APU) 250. As illustrated, the system 200 further includes various contactors for selective connecting of components therein. In one implementation of this embodiment, the HVAC power is 230 VAC (e.g., at 400 Hz) and the HVDC power is ± 270 VDC.

The first and second HVAC distribution units 210a, 210b respectively handle HVAC power generated by a first AC generator 224a, which generates HVAC electrical power via connection to a first engine 220a (e.g., a first aircraft turbine engine) and a second AC generator 224b, which generates HVAC electrical power via connection to a second engine 220b (e.g., a second aircraft turbine engine). First and second HVAC distribution units 210a, 210b each include: a start bus 212a, 212b; and a pair of HVAC buses 214a-1, 214a-2, 214b-1, 214b-2.

In some vehicle applications, more than one AC generator may be installed on the engine (e.g., multiple first AC generators 224a and multiple second AC generators 224b in FIG. 1, shown as dashed circles). In one implementation, such multiple AC generators are connected to the same HVAC bus, for example by applying synchronization techniques described in provisional application No. 60/629,423 filed Nov. 22, 2004, and entitled "Method and Apparatus for Mechanical Phase Synchronization of Multiple AC Generators," which is hereby incorporated herein by reference. Alternatively, such multiple AC generators may be connected to different HVAC buses.

The first HVAC bus 214a-1 of the first HVAC distribution unit 210a is selectively connectable to the first AC generator 224a (associated with the first engine 220a), and the second HVAC bus 214b-2 of the second HVAC distribution unit 210b is selectively connectable to the second AC generator 224b (associated with the second engine 220b). The second HVAC bus 214a-2 of the first HVAC distribution unit 210a is selectively connectable to a first AC generator 252a of the APU 250. The first HVAC bus 214b-1 of the second HVAC distribution unit 210b is selectively connectable to a second AC generator 252b of the APU 250. The first and second HVAC buses 214a-1, 214a-2, 214b-1, and 214b-2 of the first and second HVAC distribution units 210a, 210b are selectively connectable to each other.

The start bus 212a of the first HVAC distribution unit 210a is selectively connectable to the first AC generator 224a, the first AC generator 252a of the APU 250, and the start bus 212b of the second HVAC distribution unit 210b. Since the start bus and HVAC bus modes of operation in connection with the AC generator (i.e., starting and generating) are mutually exclusive, the first and second HVAC buses 214a-1, 214a-2 of the first HVAC distribution unit 210a are prevented from connecting to the start bus by selective closure of the interconnecting contactors under control of the electrical system logic. As described in greater detail below, the start bus 212a is also selectively connectable to the output end of one or more of motor controllers 248 of the first and second HVDC distribution units 240a, 240b. The start bus 212b of the second HVAC distribution unit 210b is selectively connectable to the second AC generator 224b, the second AC generator 252b of the APU 250, the first and second HVAC buses 214b-1, 214b-2 of the second HVAC distribution unit 210b, and the start bus 212a of the first HVAC distribution unit 210a. As described in greater detail below, the start bus 212b is also selectively connectable to the output end of one or more of motor controllers 248 of the first and second HVDC distribution units 240a, 240b.

The first and second HVDC distribution units 240a, 240b are arranged to receive, via contactor connections, HVAC power from the first and second HVAC distribution units 210a, 210b, respectively, and perform HVDC distribution. The first and second HVDC distribution units 240a, 240b each include: a pair of rectifier units 242*a*-1, 242*a*-2, 242*b*-1, 242*b*-2, selectively connectable to first and second HVAC buses 214*a*-1, 214*a*-2 and 214*b*-1, 214*b*-2, respectively; an HVDC bus 246*a*, 246*b*; and a plurality of motor controllers 248*a*-1, . . . , 28*a*-*n*, 248*b*-1, . . . , 248*b*-*n* (also referred to individually as motor controller 248). One or more motor controller 248 of each of the first and second HVDC distribution units 240*a*, 240*b* is selectively connectable to the start bus 212*a*, 212*b* of the first and second HVAC distribution units 210*a*, 210*b*, for the process of main propulsion or APU engine start, which is described in greater detail below. Each motor controller 248 is also each selectively connectable to utilization equipment, which is illustrated in FIG. 1 as various motors 260*a*-1, . . . , 260*a*-*n*, 260*b*-1, . . . , 260*b*-2. The particular motor types illustrated in FIG. 1 are given by way of example only. The first HVDC distribution unit 240*a* further includes an HVDC battery 244, selectively connectable to the HVDC bus 246*a* of the first HVDC distribution unit 240*a*.

The first and second rectifier units 242*a*-1, 242*a*-2 of the first HVDC distribution unit 240*a* are selectively connectable to, and convert HVAC power from, first and second HVAC buses 214*a*-1, 214*a*-2 of the first HVAC distribution unit 210*a*, respectively, and supply HVDC power to the HVDC bus 246*a* of the first HVDC distribution unit 240*a*. The HVDC bus 246*a* of the first HVDC distribution unit 240*a* is also selectively connectable to a high voltage DC generator 222*a* associated with the first engine 220*a*. The first and second rectifier units 242*b*-1, 242*b*-2 of the second HVDC distribution unit 240*b* are selectively connectable to, and convert HVAC power from, first and second HVAC buses 214*b*-1, 214*b*-2 of the second HVAC distribution unit 210*b*, respectively, and supply HVDC power to the HVDC bus 246*b* of the second HVDC distribution unit 240*b*. The HVDC bus 246*b* of the second HVDC distribution unit 240*b* is also selectively connectable to a DC generator 222*b* associated with the second engine 220*b*. The HVDC bus 246*a* of the first HVDC distribution unit 240*a* is selectively connected to the HVDC bus 246*b* of the second HVDC distribution unit 240*b*.

The system 200 illustrated in FIG. 1 has a symmetrical start bus arrangement, 212*a*, 212*b*, allowing motor controllers 248 to be connected to either engine 220*a*, 220*b* for redundancy. For efficient use of motor controllers the system 200 allows a motor controller(s) 248 to be shared with other utilization equipment 260 under control of the electrical system logic in a manner similar to the method shown for sharing the ECS compressor 260*a*-2 or 260*a*-3 with the start bus or alternately have a motor controller 248*a*-*n* dedicated to a single utility motor 260*a*-*n* such as required for a 100% duty cycle. This is shown in FIG. 1 by way of example as a selectable connection between motor controller 248*a*-3 and utility motor 260*a*-*n*. This arrangement may be used to eliminate the need for the separate motor controller 248-*n*. The design has a HVDC battery 244 for selectively starting APU 250 without requiring a voltage step up DC to DC converter. The battery 244 is float charged on the HVDC bus 246*a*, and also may be used to bridge voltage interruptions to equipment connected to the HVDC bus.

The system 200 provides a robust, symmetrical redundant electrical architecture, which considers the power flow starting with the bulk power production from high voltage AC generators 224*a*, 224*b* and DC generators 222*a*, 222*b* and subsequently provides multiple tiers of power distribution to meet the needs of the MEV. The multiple tiers refer to the multiple levels of distribution buses that handle the different voltage levels and power quality that are generated in this system. In the system 200 illustrated in FIG. 1, the HVAC distribution tier, represented by first and second HVAC distribution units 210*a*, 210*b*, handles the power produced by the AC generation system generators 224*a*, 224*b*. This power is either used in its variable frequency, high voltage format by equipment systems that are compatible with this format or is further transformed into one of the other two voltage tiers for use in the overall system as required. A second tier is considered to be the HVDC distribution level, represented by the first and second HVDC distribution units 240*a*, 240*b*. This HVDC distribution level includes input side power conversion equipment (rectifiers) 242*a*-1, 242*a*-2, 242*b*-1, 242*b*-2 for producing HVDC from HVAC. This input side conversion equipment 242*a*-1, 242*a*-2, 242*b*-1, 242*b*-2 can be implemented using transformer rectifier or active rectifier units. Output side power conversion equipment can be implemented by motor controllers 248 that feed individual equipment motors 260 or be shared for main engine start functions via the first and second start buses 212*a*, 212*b*.

Figure 2:
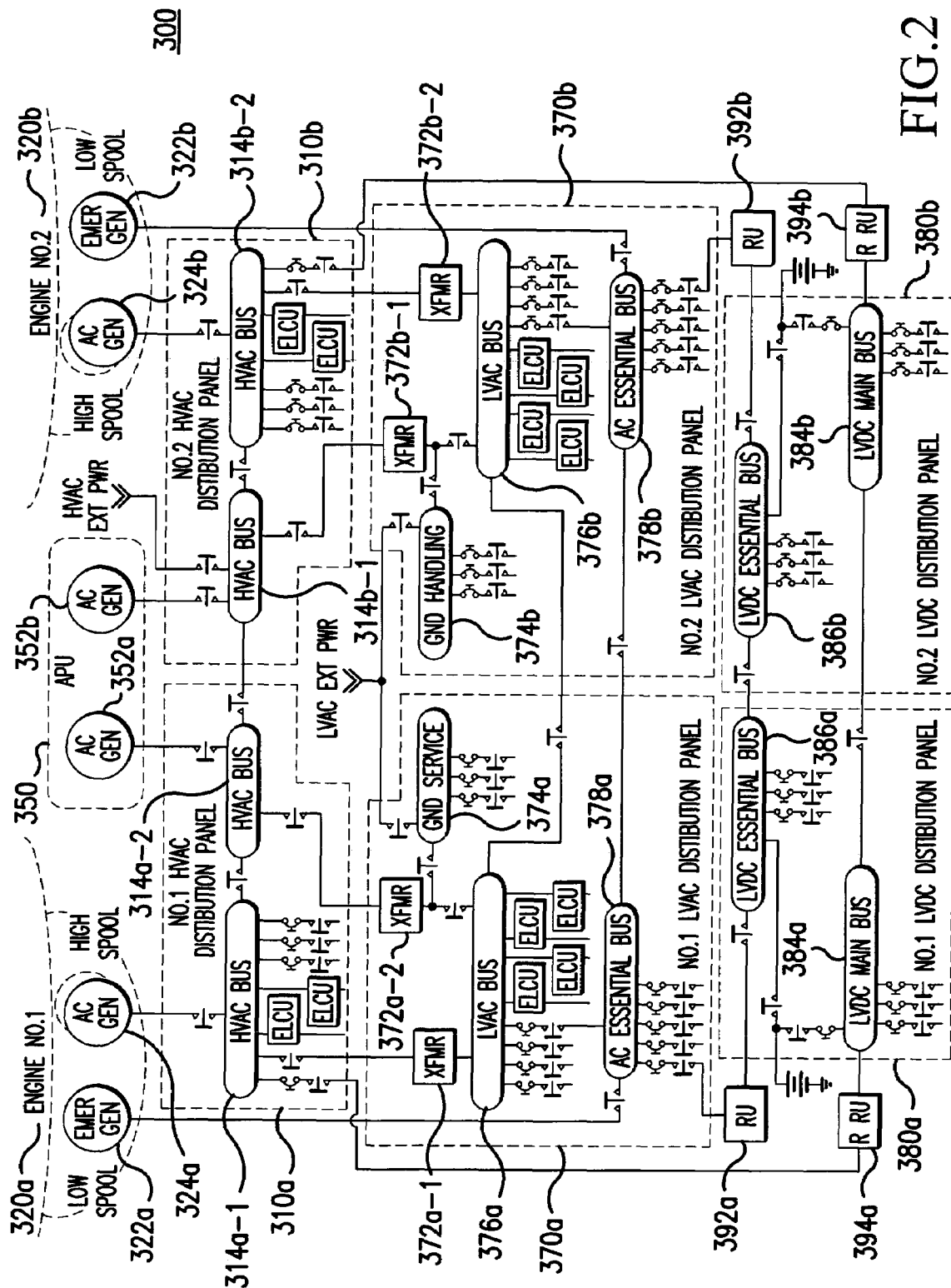
FIG. 2 illustrates an architecture for low voltage electrical starting, generation, and distribution in a more electric vehicle in accordance with an embodiment of the present invention.

A third tier is considered to be the low voltage buses that support conventional, non-MEV types of equipment on an vehicle. This third tier actually includes two separate sub tiers that include low voltage AC buses (typically 115 VAC) and low voltage DC buses (typically 28 VDC). This third tier of electrical power distribution with be discussed in detail below with reference to FIG. 2. FIG. 1 and FIG. 2 can be considered separately or in combination creating a complete electrical starting, generation and distribution system whereby the $1^{st}$ and $2^{nd}$ high voltage AC distribution units and AC generators are common elements of the two figures.

FIG. 2 also shows how through appropriate switching connections, high voltage AC can be interfaced with the aircraft buses to provide power for engine starting and support of high voltage systems when on ground without APU or engine generators on line. The architecture in FIG. 1 also incorporates a high voltage battery 244 that can be used not only to perform APU starts, but also can provide temporary power to bridge switching interruptions or provide short duration operation of other HVDC systems. The configuration shown allows battery 244 to be float charged in order to eliminate the battery chargers used in existing vehicle battery systems. The battery 244 is a HVDC battery that is connected to the HVDC bus 246*a* through a line contactor. During engine starting, the battery line contactor closes and energizes the HVDC bus 246*a*. Although HVDC bus 246*a* is the primary bus for APU start power supply, it can clearly be seen from the figure that through cross connections under EEMS control, power from the HVDC battery 244 can be routed through a cross tie contactor(s) to HVDC bus 246*b* and further to motor controllers 248*b* and then to the start buses 212*b* and 212*a* as may be required. Power is then available to the applicable motor controller(s) 248. When the start control, either as part of or in combination with an electrical energy management system (EEMS), receives command to start the APU 250, the motor controller(s) 248 is activated in the start mode, the start buses 212*a* or 212*b* are energized and connected to the APU generator 252*a* or 252*b* through the appropriate closure of cross tie contactors. When power is applied to the AC generator 252*a* or 252*b*, the AC generator is driven as a motor to provide rotational torque to start the APU 250. Although typical APU starting torque requirements are low relative to the main engine start torque requirements and for reasons of generation capacity needed by the electrical system and interchangeability of generators between the main engine and the APU, the same generators are typically used on the engine and APU and therefore a single generator may be sufficient to start the smaller APU. However the architecture presented does not preclude by way of the interconnectivity provided in the system, the ability to energize both start buses and both AC generators in order to deliver sufficient torque as may be required to start an APU of greater starting torque that can be supplied by a single installed generator. This could be the case if a larger than typical APU is installed or the generator sizes selected for the APU were significantly smaller in size than the main engine generators such that single generator was not capable of starting a typical sized APU.

When the HVDC battery 244 is connected to the HVDC bus 246a for starting the APU 250, it will deplete its energy into the bus 246a during that process. If the battery remains connected to the HVDC bus 246a after the start is complete and the APU generators 252a, 252b are brought on line, the battery 244 will float on the energized HVDC bus 246a and receive a charging input from the HVDC bus 246a to replenish its capacity. By choosing the terminal voltage of the battery 244 suitably lower than the regulated generator output voltage on the HVDC bus 246a, the resulting float charge capability eliminates the need for dedicated battery-charging equipment. The implementation of a HVDC battery 244 as opposed to conventionally used LVDC batteries also eliminates the need for complex step-up transformers to produce HVDC.

When connected to achieve the capabilities described, the HVDC battery 244 in this system 200 can also provide bridging power to other systems in the event of power interruption or bus switching operations. During brief power interruptions, the HVDC battery 244 floating of the HVDC bus 246a can immediately begin outputting its stored power reserve onto the HVDC bus 246a. This ability allows time for the system cross tie contactors to reconnect the HVDC bus 246a to an active generating source without momentary loss of the individual systems attached to the HVDC bus 246a during the transfer. In the event of a critical power requirement for motor controls, depending upon the amount of installed HVDC battery capacity, the EEMS can connect only those services required at a particular time to the HVDC battery 244 via the HVDC bus 246a to provide limited service. The bridging function can apply to all HVDC services connected to the HVDC bus 246a, such as cabin air compressors, hydraulic pumps, fans, and actuators. Limited equipment operation based upon installed battery capacity in the event of unrecoverable generated power loss may include hydraulic pumps or electric motors to deploy emergency systems or landing gear and provide energy to critical flight control surface actuators (for implementation in an aircraft).

FIG. 2 illustrates a system for low voltage power conversion and distribution in accordance with an embodiment of the present invention. In the embodiment of FIG. 2, a low voltage electrical power system 300 includes: first and second engines 320a, 320b (same engines as in FIG. 1 in one implementation); first and second high voltage distribution units 310a, 310b (same as corresponding elements in FIG. 1 in one implementation, but illustrated without start buses); first and second low voltage AC (LVAC) distribution units 370a, 370b; and second low voltage DC (LVDC) distribution units 380a, 380b; and an auxiliary power unit (APU) 350. As illustrated, the system 300 further includes various contactors for selective connecting of components therein.

The first and second HVAC distribution units 310a, 310b respectively handle HVAC power generated by a first AC generator 324a, which generates AC electrical power via connection to a first engine 320a (e.g., a first aircraft turbine engine) and a second AC generator 324b, which generates AC electrical power via connection to a second engine 320b (e.g., a second aircraft turbine engine). First and second HVAC distribution units 310a, 310b each include a pair of selectively connectable HVAC buses 314a-1, 314a-2, 314b-1, 314b-2. The first HVAC bus 314a-1 of the first HVAC distribution unit 310a is selectively connectable to the first AC generator 324a, and the second HVAC bus 314b-2 of the second HVAC distribution unit 310b is selectively connectable to the second AC generator 324b.

The second HVAC bus 314a-2 of the first HVAC distribution unit 310a is selectively connectable to the first HVAC bus 314b-1 of the second HVAC distribution unit 310b. The second HVAC bus 314a-2 of the first HVAC distribution unit 310a is selectively connectable to a first AC generator 352a of the APU 350, and the first HVAC bus 314b-1 of the second HVAC distribution unit 310b is selectively connectable to a second AC generator 352b of the APU 350.

The first LVAC distribution unit 370a includes: a LVAC bus 376a; a pair of transformers 372a-1, 372a-2, selectively connectable to the first and second HVAC buses 314a-1, 314a-2 of the first HVAC distribution unit 310a, respectively, for converting HVAC to LVAC power and providing such LVAC power to the LVAC bus 376a; a ground service bus 374a, selectively connectable to LVAC external power and selectively connectable to the LVAC bus 376a; and an AC essential bus 378a, which is selectively connectable to the LVAC bus 376a and also selectively connectable to a first emergency generator (associated with the first engine 320a).

The second LVAC distribution unit 370b includes: a LVAC bus 376b; a pair of transformers 372b-1, 372b-2, selectively connectable to the first and second HVAC buses 314b-1, 314b-2 of the second HVAC distribution unit 310b, respectively, for converting HVAC to LVAC power and providing such LVAC power to the LVAC bus 376b; a ground handling bus 374b, selectively connectable to LVAC external power and selectively connectable to the LVAC bus 376b of the second LVAC distribution unit 370b and the ground service bus 374b; and an AC essential bus 378b, which is selectively connectable to the LVAC bus 376b of the second LVAC distribution unit 370b and also selectively connectable to a second emergency generator (associated with the second engine 320b).

The LVAC bus 376a of the first LVAC distribution unit 370a is selectively connectable to the LVAC bus 376b of the second LVAC distribution unit 370b. The AC essential bus 378a of the first LVAC distribution unit 370a is selectively connectable to the AC essential bus 378b of the second LVAC distribution unit 370b.

The first LVDC distribution unit 380a and the second LVDC distribution unit 380b each include: an LVDC essential bus 386a, 386b; and an LVDC main bus 384a, 384b. The LVDC essential bus 386a of the first LVDC distribution unit 380a is selectively connectable to a first rectifier unit 392a, which is selectively connectable to the AC essential bus 378a of the first LVAC distribution unit 370a to convert LVAC power to LVDC power for the LVDC essential bus 386a of the first LVDC distribution unit 380a. The LVDC essential bus 386b of the second LVDC distribution unit 380b is selectively connectable to a second rectifier unit 392b, which is selectively connectable to the AC essential bus 378b of the second LVAC distribution unit 370b to convert LVAC power to LVDC power for supply to the LVDC essential bus 386b of the second LVDC distribution unit 380b.

The LVDC essential buses 386a, 386b of the first and second LVDC distribution units 380a, 380b are selectively connectable. The LVDC main buses 384a, 384b of the first and second LVDC distribution units 380a, 38Gb are selectively connectable. The LVDC main bus 384a of the first LVDC distribution unit 380a is selectively connectable to the LVDC essential bus 386a of the first LVDC distribution unit

380*a*. The LVDC main bus 384*b* of the second LVDC distribution unit 380*b* is selectively connectable to the LVDC essential bus 386*b* of the second LVDC distribution unit 380*b*. A first regulated rectifying unit 394*a* is selectively connectable to the first HVAC bus 314*a*-1 of the first HVAC distribution unit 310*b* to convert HVAC power to generate regulated LVDC power, which is output to the LVDC main bus 384*a* of the first LVDC distribution panel 380*a*. A second regulated rectifying unit 394*b* is selectable connectable to the second HVAC bus 314*b*-2 of the second HVAC distribution unit 310*b* to convert HVAC power to regulated LVDC power, which is output to the LVDC main bus 384*b* of the second LVDC distribution unit 380*b*. Although the regulated rectifying units 394*a* and 394*b* are the preferred implementation due to their superior battery charging characteristics, passive rectifier units as used in positions 392*a* and 392*b* could be used provided that their output characteristics are suitably chosen and matched for the purpose of battery charging.

The system 300 illustrated in FIG. 2 generates, converts and distributes low voltage AC and DC power and generates and distributes emergency AC power from an engine compressor fan driven AC generator 322*a*, 322*b* and then channels such power through an AC to DC conversion network to produce essential DC power. As illustrated in FIG. 2, the system 300 includes within the low voltage network, an arrangement to connect equipment used both in flight and on ground during ground service or ground handling operations through appropriate interconnecting switches. When on ground, the limited services necessary for ground operations can be connected directly to the LVAC external power, eliminating the need to fully power the aircraft to enable those systems. Alternately, the entire LVAC and LVDC bus networks can be enabled from ground power by further switching connections to power electrical loads common to both ground and in-flight operation or alternately these same electrical loads can be powered from the vehicle's main generation sources. LVDC batteries in the DC main and essential networks are also float charged from regulated rectifier units (R RU) 394*a*, 394*b* to once again eliminate the charger and provide protection against power interruptions due to switch or momentary power loss. As previously discussed, RRU's could be replaced by passive RUs through careful selection of output voltage characteristics.

Also included is an emergency generator 322*a*, 322*b* on the engine compressor fan low-speed spool. Should an engine 320*a*, 320*b* flame out, the fan acts as a ram air turbine (RAT) to spin the emergency generator 322*a*, 322*b*. The fan generator 322*a*, 322*b* eliminates the complexity of a conventional RAT and increases the reliability of the system while lowering costs. Alternately, the architecture does not preclude the use of a conventional federated RAT unit to feed power into the AC essential buses without the advantages of the low-speed spool integrated approach discussed previously.

During ground support operations when power is available on the LVAC buses 376*a*, 376*b*, the bus architecture contactors allow aircraft service personnel to select services required by them to maintain, clean, load, and move the aircraft while on the ground. By interfacing with the appropriate command interface panel (not shown), the applicable personnel can energize ground service or ground handling equipment that they may require and have those services available without the need to fully power all aircraft systems which is often the case on existing aircraft.

This system 300 uses the ground service bus 374*a* and the ground handling bus 374*b* as a series connection between the LVAC buses 376*a*, 376*b* and the external power supply. Where other existing aircraft make the ground buses a branch from the LVAC buses, the system 300 illustrated in FIG. 2 puts them in series to avoid having to completely power the LVAC bus system and subsequently energize a branch circuit to provide ground services. Therefore, when ground operations are being performed, the EEMS upon command request for services by the ground crew, can power the ground handling and ground service bus segment only, leaving the LVAC buses off unless specifically required. This reduces the operation duration of operation or systems directly connected to the LVAC bus as well as minimizes the hazard to ground and maintenance crew by minimizing the number of live electrical circuits. To configure in this manner only the contactor between the LVAC external power input and the ground handling and ground service buses need to be closed by the EEMS.

In one exemplary implementation, the ground service bus 374*a* includes those services that are required by ground crew to service and maintain the aircraft. Such functions supported could be lighting, electrical power outlets for cleaning equipment, communication/intercom equipment, loading of galley supplies, waste water removal, etc. Ground handling functions are related to movement of the aircraft such as towing or lifting, opening and closing of access doors, moving of cargo (motorized cargo rollers, winches, hoists) and the like. Both ground service and ground handling functions are typically activities that would occur while the aircraft is on ground and under the supervision of non-flight crew. For systems that may overlap between ground and flight operations, the ground handling and service buses can be connected to the LVAC buses in flight via the two contactors that exist between the buses.

The symmetric and redundant connections that are provided in above-described designs are afforded by the series of cross tie contactors in a ladder type configuration. As with the other buses in this architecture, the arrangement allows for maximum flexibility and reconfiguration resulting in a high availability of power to the equipment systems connected to the buses. Due to the reconfiguration capability, this type of arrangement along with the redundant power supply input results in a highly reliable power supply for critical and essential systems.

Significant to above-described arrangements is the concept of reusing power paths and switching equipment to provide more that one function within the system. This reduces switching hardware and buses common to traditional approaches but through the symmetrical, redundant configuration does not limit availability and functionality required for the MEV. This further translates into lower weight, lower cost, and higher reliability. The approach taken in the above-described arrangements provides mutually beneficial approaches for both existing and MEV. The architecture presented maintains complete symmetry and incorporates cross tie connections to provide redundancy across all power supply functions. This approach simplifies the end component design criticality requirements by providing redundancy at the power distribution level, hence increasing the availability of power and hence the individual service. This benefit, although desirable in a conventional aircraft/vehicle design, is particularly important to the implementation of an MEV since as more equipment systems migrate to a reliance upon electrical power, the electrical power availability must be assured to maintain high safety and operability levels.

Specific to the MEV is the use of motor controllers to perform multiple functions in order to justify their relatively high weight and cost. The distribution systems described herein provide the symmetry and redundancy that results in power availability consistent with the criticality of MEV systems. On the output side of the motor controllers, the ring start bus 212a, 212b with its multiple cross tie contactors, allows all main engine start capable, motor controllers to connect to all main engine and APU AC starter generators to provide the greatest engine start capability from available motor controllers. Through the EEMS, power management logic within that system is capable of co-coordinating subsystem services that utilize the motor controllers with any call for engine starting to ensure that all required functions can be performed with the available equipment.

The EEMS as described in co-pending application filed Aug. 4, 2005, titled "Electrical Energy Management on a More Electric Vehicle," may be implemented to provide coordinated supervisory control of the electrical power system power supplies and distribution. However as an architecture, this approach could be controlled via individual controllers in a more federated approach or by control commands received from the vehicle systems controller or central computing systems (CCS).

Although the architectures presented show the generation, conversion and distribution equipment and bus interconnections, an additional element not shown but implied is the control logic that coordinates the actions, protections and status reporting of the system. A preferred method to attain the required level of control is through the use of an EEMS. This system may incorporate dual redundant, high criticality and availability control units that co-ordinate and sequence the actions of the electrical system architecture shown with that of other flight deck interfaces, aircraft utility systems, avionics and the engine electronic control. Such a system is described in detail in co-pending application Ser. No. 11/199, 151 filed Aug. 4, 2005, titled "Electrical Energy Management on a More Electric Vehicle."

It should be recognized that many permutations and combinations of control sequences and timing are possible through the use of the EEMS and that the symmetry of the electrical system architectures provides the flexibility to realize many different configurations. Also, the ability to automate functions that may have previously been performed manually by the flight crew reduces pilot workload as well as provides immediate response to conditions that the pilot could not manually control with sufficient rapidity to avert damage or hazard.

I claim:

1. A system for distributing electrical power, comprising:
    a first high voltage AC power distributing unit including a first high voltage AC bus, which is selectively connected to a first high voltage AC generator, and a first start bus;
    a second high voltage AC power distributing unit including a second high voltage AC bus, which is selectively connected to a second high voltage AC generator, and a second start bus;
    a first high voltage DC power distributing unit including a first rectifier unit, a first high voltage DC bus, and a first motor controller, said first rectifier unit being selectively connected to said first high voltage AC bus of said first high voltage AC power distributing unit to convert high voltage AC power to high voltage DC power, which is provided to said first high voltage DC bus; and
    a second high voltage DC power distributing unit including a second rectifier unit, a second high voltage DC bus, and a second motor controller, said second rectifier unit being selectively connected to said second high voltage AC bus of said second high voltage AC power distributing unit to convert high voltage AC power to high voltage DC power, which is provided to said second HVDC bus, wherein
    said first high voltage DC bus is selectively connectable to said second high voltage DC bus, said first high voltage AC bus is selectively connectable to said second high voltage AC bus, and said first start bus is selectively connectable to said second start bus, and
    said system provides redundancy for both high voltage AC power distribution and high voltage DC power distribution.

2. The system according to claim 1, wherein
    said first and second high voltage AC buses are each divided into high voltage AC bus segments that are selectively connectable, and
    a segment of said first high voltage AC bus is selectively connected to said first AC generator and a segment of said second high voltage AC bus is selectively connected to said second AC generator.

3. The system according to claim 2, wherein
    another segment of said first high voltage AC bus is selectively connected to a first auxiliary power unit generator, and
    another segment of said second high voltage AC bus is selectively connected to a second auxiliary power unit generator.

4. The system according to claim 2, wherein
    said first high voltage distributing unit includes multiple rectifiers, which, respectively, are selectively connected to different segments of said first high voltage AC bus, and
    said second high voltage distributing unit includes multiple rectifiers, which, respectively, are selectively connected to different segments of said second high voltage AC bus.

5. The system according to claim 1, wherein said first high voltage DC distributing unit further includes a high voltage battery, which is selectively connected to and float charged by said high voltage DC bus, said battery being used to power start of an auxiliary power unit (APU).

6. The system according to claim 5, wherein
    output power from said first motor controller of said first high voltage DC distributing unit is selectively connected to said first start bus during APU start, and
    output power from said second motor controller of said second high voltage DC distributing unit is selectively connected to said second start bus during APU start.

7. The system according to claim 6, wherein
    said first high voltage DC distributing unit includes multiple motor controllers, output power from said multiple motor controllers of said first high voltage DC distributing unit being selectively connected to said first start bus during APU start, and
    said second high voltage DC distributing unit includes multiple motor controllers, output power from said multiple motor controllers of said second high voltage DC distributing unit being selectively connected to said second start bus during APU start.

8. The system according to claim 5, wherein said battery of said first high voltage distributing unit is selectively connected to said high voltage DC bus to bridge power interruptions on said first high voltage DC bus.

9. The system according to claim 1, wherein said system distributes high voltage AC and DC power in a more electric vehicle.

10. The system according to claim 9, wherein said more electric vehicle is an aircraft.

11. The system according to claim 1, further comprising:
    a first low voltage AC distributing unit, including a first low voltage AC bus, said first low voltage AC distributing unit converting high voltage AC power to low voltage AC power, which is supplied to said first low voltage AC bus;

a second low voltage AC distributing unit, including a second low voltage AC bus, said second low voltage AC distributing unit converting high voltage AC power to low voltage AC power, which is supplied to said second low voltage AC bus;

a first low voltage DC distributing unit, including a first low voltage DC essential bus and a first low voltage DC main bus; and a second low voltage DC distributing unit, including a second low voltage DC essential bus and a second low voltage DC main bus.

12. The system according to claim 11, wherein said first low voltage AC distributing unit includes a ground service bus, selectively connectable to low voltage AC external power and selectively connectable to said first low voltage AC bus, and said second low voltage AC distributing unit includes a ground handling bus, selectively connectable to low voltage AC external power and selectively connectable to said second low voltage AC bus, said ground handling bus being selectively connectable to said ground service bus.

13. A system for distributing electrical power, comprising a first high voltage AC power distributing unit including a first high voltage AC bus, which is selectively connected to a first high voltage AC generator, and a first start bus;

a second high voltage AC power distributing unit including a second high voltage AC bus, which is selectively connected to a second high voltage AC generator, and a second start bus;

a first high voltage DC power distributing unit including a first rectifier unit, a first high voltage DC bus, and a first motor controller, said first rectifier unit being selectively connected to said first high voltage AC bus of said first high voltage AC power distributing unit to convert high voltage AC power to high voltage DC power, which is provided to said first high voltage DC bus;

a second high voltage DC power distributing unit including a second rectifier unit, a second high voltage DC bus, and a second motor controller, said second rectifier unit being selectively connected to said second high voltage AC bus of said second high voltage AC power distributing unit to convert high voltage AC power to high voltage DC power, which is provided to said second HVDC bus, wherein said first high voltage DC bus is selectively connectable to said second high voltage DC bus, said first high voltage AC bus is selectively connectable to said second high voltage AC bus, and said system provides redundancy for both high voltage AC power distribution and high voltage DC power distribution;

a first low voltage AC distributing unit, including a first low voltage AC bus, said first low voltage AC distributing unit converting high voltage AC power to low voltage AC power, which is supplied to said first low voltage AC bus;

a second low voltage AC distributing unit, including a second low voltage AC bus, said second low voltage AC distributing unit converting high voltage AC power to low voltage AC power, which is supplied to said second low voltage AC bus;

a first low voltage DC distributing unit, including a first low voltage DC essential bus and a first low voltage DC main bus; and a second low voltage DC distributing unit, including a second low voltage DC essential bus and a second low voltage DC main bus, wherein said first low voltage AC distributing unit includes a first AC essential bus, selectively connectable to a first emergency generator and selectively connectable to said first low voltage AC bus, and said second low voltage AC distributing unit includes a second AC essential bus, selectively connectable to a second emergency generator and selectively connectable to said second low voltage AC bus.

14. A system for distributing electrical power, comprising:

a first high voltage AC power distributing unit including a first high voltage AC bus, which is selectively connected to a first high voltage AC generator;

a second high voltage AC power distributing unit including a second high voltage AC bus, which is selectively connected to a second high voltage AC generator;

a first low voltage AC power distributing unit including a first low voltage AC bus and a first AC essential bus, which is selectively connectable to a first emergency generator and selectively connectable to said first low voltage AC bus, wherein said first low voltage AC power distributing unit is selectively connectable to said first high voltage AC bus to convert high voltage AC power to low voltage AC power, which is output to said first low voltage AC bus;

a second low voltage AC power distributing unit including a second low voltage AC bus and a second AC essential bus, which is selectively connectable to a second emergency generator and selectively connectable to said second low voltage AC bus, wherein said second low voltage AC power distributing unit is selectively connectable to said second high voltage AC bus to convert high voltage AC power to low voltage AC power, which is output to said second low voltage AC bus;

a first low voltage DC power distributing unit including a first low voltage DC essential bus and a first low voltage DC main bus; and a second low voltage DC power distributing unit including a second low voltage DC essential bus and a second low voltage DC main bus, wherein said first high voltage AC bus is selectively connectable to said second high voltage AC bus, said first low voltage AC bus is selectively connectable to said second low voltage AC bus, said first AC essential bus is selectively connectable to said second AC essential bus, said first low voltage DC essential bus is selectively connectable to said second low voltage DC essential bus, and said first low voltage DC main bus is selectively connectable to said second low voltage DC main bus, thereby providing redundancy of both low voltage AC power distribution and low voltage DC power distribution.

15. The system according to claim 14, wherein said first low voltage AC distributing unit includes a ground service bus, selectively connectable to low voltage AC external power, and said second low voltage AC distributing unit includes a ground handling bus, selectively connectable to said low voltage AC external power.

16. The system according to claim 15, wherein said ground service bus is selectively connectable to said first low voltage AC bus and said ground handling bus, and said ground handling bus is selectively connectable to said second low voltage AC bus and said ground service bus.

17. The system according to 14, wherein said first high voltage AC bus includes multiple connectable bus segments, one segment being selectively connectable to said first AC generator and another segment being selectively connectable to a first AC generator of an auxiliary power unit, and said second high voltage AC bus includes multiple connectable bus segments, one segment being selectively connectable to said second AC generator and another segment being selectively connectable to a second AC generator of said auxiliary power unit.

18. The system according to claim 14, wherein said first AC generator and said first emergency generator are associated with a first aircraft engine, and said second AC generator and said second emergency generator are associated with a second aircraft engine.

19. The system according to claim 14, wherein said first low voltage DC main bus receives regulated low voltage DC power from a conversion element that is selectively connectable to said first high voltage DC bus, and said second low voltage DC main bus receives regulated low voltage DC power from a conversion element that is selectively connectable to said second high voltage DC bus.

20. The system according to claim 19, wherein batteries are selectively float charged on said first and second low voltage DC buses.

* * * * *